Figure 1:
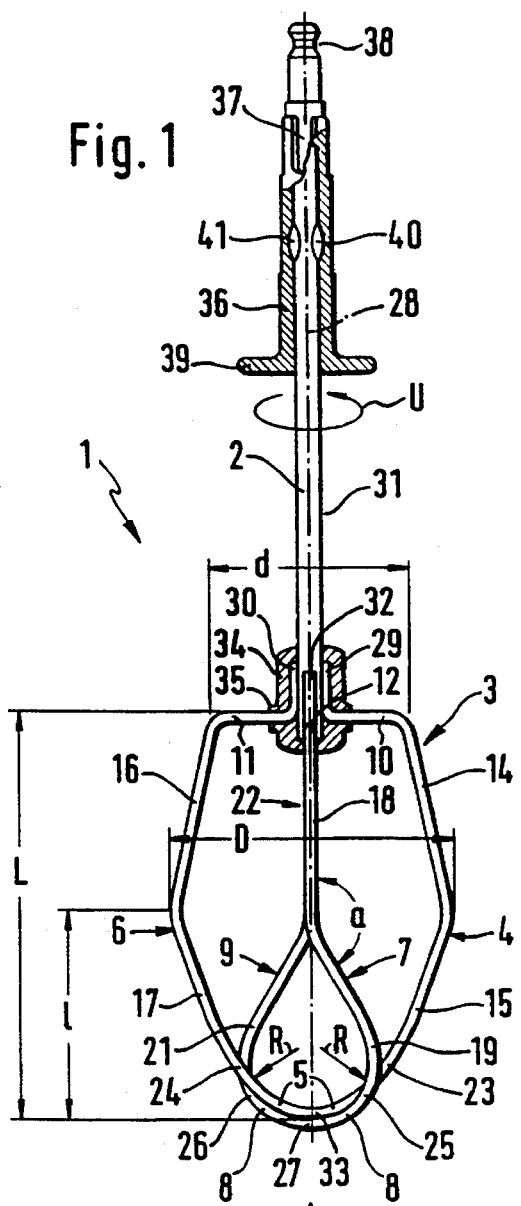

United States Patent [19]
Millan et al.

[11] Patent Number: 5,590,962
[45] Date of Patent: Jan. 7, 1997

[54] ROTATING BEATER

[75] Inventors: Jose Millan; Desiderio Falco; Emilio R. Soberino, all of Barcelona, Spain

[73] Assignee: Braun Aktiengesellschaft, Kronberg, Germany

[21] Appl. No.: 425,834

[22] Filed: Apr. 20, 1995

[30] Foreign Application Priority Data

Apr. 23, 1994 [DE] Germany ............... 44 14 228.5

[51] Int. Cl.⁶ .................................................. B01F 7/32
[52] U.S. Cl. ................ 366/248; 366/343; 416/227 R
[58] Field of Search .................................. 366/342, 343, 366/244, 247, 248, 129, 604, 605; 416/70 R, 69, 227 R, 231 A; D7/690

[56] References Cited

U.S. PATENT DOCUMENTS

| | | | |
|---|---|---|---|
| 1,268,284 | 6/1918 | Ryerson | 366/343 |
| 1,463,736 | 7/1923 | Ward | 366/343 |
| 1,960,089 | 5/1934 | Rabb | 366/129 |
| 3,154,297 | 10/1964 | Lövgren | 363/343 |
| 5,411,330 | 5/1995 | Arutyunov et al. | 366/343 |

FOREIGN PATENT DOCUMENTS

| | | |
|---|---|---|
| 0216234 | 4/1987 | European Pat. Off. . |
| 0410527A1 | 1/1991 | European Pat. Off. . |
| 1941321 | 2/1971 | Germany . |
| 2815697 | 4/1978 | Germany . |
| 3346147A1 | 12/1983 | Germany . |
| 903130 | 7/1982 | U.S.S.R. ............ 366/343 |
| 1473828 | 4/1989 | U.S.S.R. ............ 366/343 |
| 690127 | 3/1953 | United Kingdom . |

*Primary Examiner*—Timothy F. Simone
*Assistant Examiner*—Tony G. Soohoo
*Attorney, Agent, or Firm*—Fish & Richardson P.C.

[57] ABSTRACT

The present invention relates to a rotating beater (1) adapted to be rotated by a drive shaft (2), including at least one wire-shaped beater element (3, 22), which starts from the drive shaft (2), extends further in the direction of the drive shaft and, finally, after one or a plurality of changes in its direction of extension, is led back to the drive shaft (2). The course of the beater element (3, 22) is substantially subdivided into a first section (4, 7) in the extension of the drive shaft (2), a second section (5, 8) extending substantially transversely to the drive shaft (2), and a third (6, 9) section (6), with the first (4, 7) and third (6, 9) sections extending so that their ends (10, 11 or 12, 13, respectively) starting from the drive shaft (2) lag behind their other ends (23, 24 or 25, 26, respectively) in the direction of rotation (U) of the beater. According to the present invention, the first (4, 7) and third (6, 9) sections include upper (14, 16; 18, 20) and lower (15, 17; 19, 21) segments having different directions of extension, with the lagging behind of the first (4, 7) and third (6, 9) sections being, substantially, effected by the direction of extension of the lower segment (15, 17; 19, 21) alone. Good mixing results are achieved thereby, without foods being spattered.

15 Claims, 1 Drawing Sheet

ROTATING BEATER

The present invention relates to a rotating beater adapted to be rotated by a drive shaft, including at least one wire-shaped beater element, which starts from the drive shaft, extends further in the direction of the drive shaft and, finally, after one or a plurality of changes in its direction of extension, is led back to the drive shaft, the course of the beater element being substantially subdivided into a first section in the extension of the drive shaft, a second section extending substantially transversely to the drive shaft, and a third section, with the first and third sections extending so that their ends starting from the drive shaft lag behind their other ends in the direction of rotation of the beater head.

Beaters of this type have been known for many years. More particularly, they are used for mixing and frothing foods and are adapted to be coupled especially to electrically operated hand mixers and driven by them. DE-A-19 41 321 discloses a beater wherein the beater elements are spiral-shaped wires.

An object of the present invention is to improve upon a rotating beater by particularly straightforward means such as to allow mixing particularly liquid foods as intensively as possible and in the shortest possible time, without the foods being spattered inadmissibly.

According to the present invention, this object is achieved in that the first and third sections, substantially, include upper and lower segments having different directions of extension, and in that the lagging behind of the first and third sections is, substantially, effected by the direction of extension of the lower segment alone. A certain organisation of work at the beater is performed by a wire-shaped beater element being subdivided into three sections, both the first and third sections, according to the present invention, being composed of one upper and lower segment each having different directions of extension. Due to the upper segment lagging behind the lower segment, when viewed in the direction of rotation of the beater, the foods are caught by these sections particularly intensively and moved or tossed upwardly. At the upper segments, however, which extend substantially in parallel to the central axis of the drive shaft, the foods are then carried along in the direction of rotation, having sufficiently calmed down, though, so that the foods tossed upwards by the lower segments will not be moved further upwardly.

The smaller the angle between the upper and lower segments is, the more the foods are tossed upwardly. Besides, this is a standard for how the volume of foods to be mixed, such as cream, egg white or similar foods, may be increased in the shortest possible time, i.e. how fluffy and frothy foods become. Thus, a beater is provided by the present invention which, on the one hand, mixes food intensively and frothes it extremely quickly, and, on the other hand, tends to spatter the food very rarely. Beaters of this type can be used not only in hand mixers but also in large multi-purpose food processors.

Particularly good mixing results with satisfactory frothing have been achieved by the lower segment and the upper segment of a beater element forming an angle of about 120°. This applies both to the first and third sections of a beater element.

According to the features of patent claim 3, similar good beating results are obtained, irrespective of the bowl being filled more or less. However, a filling level is preferred which is somewhat above the upper ends of the lower segments.

Further, it is favorable that the second sections are split in the middle and interconnected by a connecting element. Due to this arrangement, a mixing element made of wire may consist of two pieces, with the splitting being in the middle of the second section. The two sections can then be interconnected at this point, for example, by spray-coating in a subsequent working operation. Because the wire can be bent particularly easily, advantageously, the beater elements are formed by bending from one single wire. The lower sections lie on top of each other, i.e. with four beater elements, for example, four lower sections would be placed on top of each other.

Due to the transversely extending second section being curved towards the middle, the beater element has only one central point of contact with the bottom of a bowl. Particularly little friction is caused thereby and, additionally, the hand mixer, along with the beater, may be held at a certain inclination, without the entire broad side of the second section abutting against the bottom of a bowl.

A straight-lined course at each half of the second section can be chosen due to the second section being inclined from the middle in relation to the horizontal line about the angle "b". This also facilitates bending the beater elements. In particular small quantities, e.g. cream and egg white, can be processed properly due to the provision of the angle "b". Nevertheless, the non-processed area in kneading doughs beneath the wire is so small that practically no disadvantages result, in particular, when one makes the beater follow the surface of the bowl bottom during the beating operation.

Particularly good mixing results have further been obtained by an angle being formed between the second section and the associated end extending from the drive shaft which amounts to 52° approximately. This angle determines the degree of the decline from the second to the first section, namely this angle is influenced also by the bottom segment extending in a straight line. Particular ease of manufacture of the beater element is achieved due to all the sections provided at the beater element having straight lines and being rounded at their transitions only. Very good beating and frothing results are already obtained with one beater and two beater elements. The material requirement and the expenditure in the manufacture of single parts is still comparatively low so that only low prices are incurred for the manufacture of such a beater.

One embodiment of the present invention is shown in the drawing and will be described in the following. In the drawing, FIG. 1 is a lateral view of the beater according to the present invention, FIG. 2 is a lateral view from inside right on the beater according to FIG. 1, the angle of view, however, being chosen such, as shown by the direction of the arrow Y in FIG. 3, that the lower section 8 is disposed in the axis of the central line 28, and FIG. 3 is a view on the beater from below in the direction X according to FIG. 1.

Figure 2:
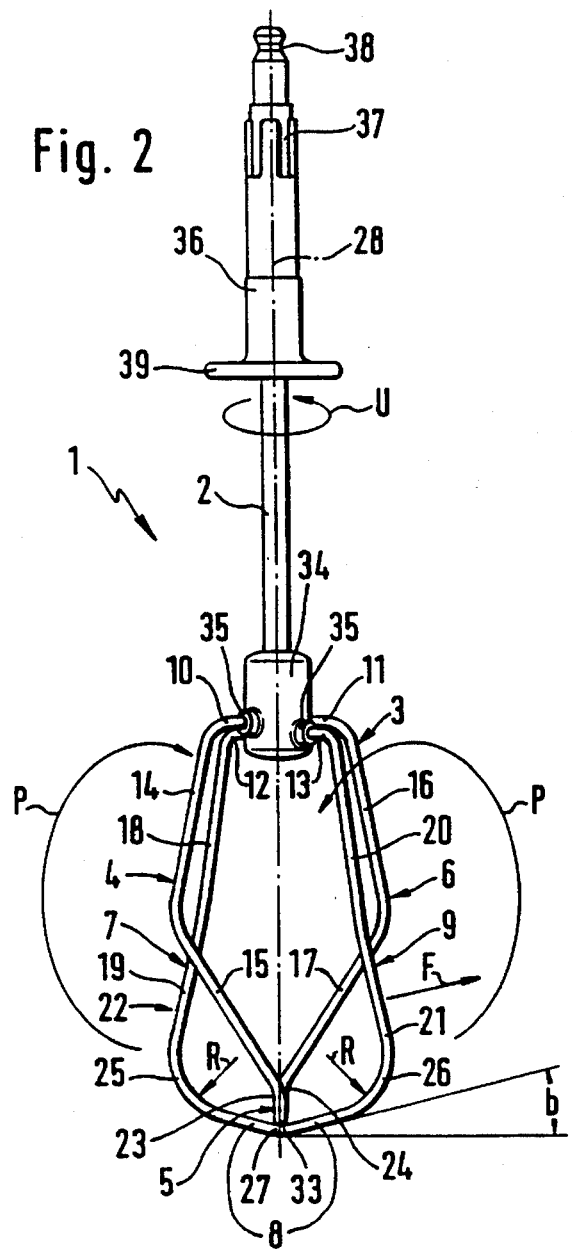
Figure 3:
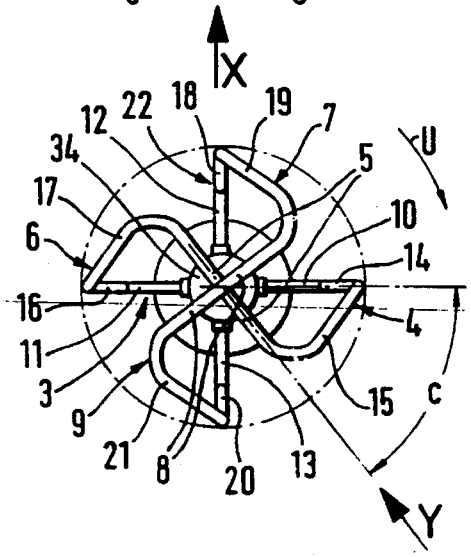

The beater 1 in FIGS. 1 to 3, substantially, is composed of a drive shaft 2 made of wire and extending along the central line 28 of the beater 1. Two beater elements 3, 22 adopting the shape of a closed loop are attached at the lower free end of the drive shaft 2. The beater elements 3, 22 have the same shape so that only one of the beater elements 3, 22 will be dealt with in detail.

The two beater elements 3, 22 form the shape of a cross and extend substantially vertically relative to each other. The beater element 3 formed by a wire loop includes at its two free ends an end section 29, 30, which extends in parallel to the drive shaft 2 and adjacent to which is each one end 10, 11 bent off by 90°. Adjacent to the end 10 is a substantially downwardly extending first section 4 which, mainly, consists of an upper segment 14 and a lower segment 15. The upper and lower segments 14, 15 form the first section 4 of the beater element 3.

Through radius R, which amounts to roughly 11 mms, the lower segment 15 of the first section 4 is followed by the second section 5 which extends substantially transversely to the first section 4 or the drive shaft 2. The second section 5 forms a middle 27 where the deepest point of the beater element 3 is reached. The central line 28 forms the line of symmetry of both the beater element 3 and the beater element 22.

On the left of the central line 28, the second part of the second portion 5 extends and terminates again into radius R, following which, in turn, is the third section 6 which is symmetrically opposed to the first section 4. The third section 6, in turn, ends into the horizontally extending end 11 which extends towards the drive shaft 2 and ends into the deflected end section 30 being in parallel to the drive shaft 2. Both end sections 29, 30 bear against the peripheral surface 31 of the drive shaft 2.

The beater element 22 takes the same course as the beater element 3 and, thus, also starts with an end section 32 (FIG. 1), following which is the horizontally extending end 12. Adjacent to end 12, in turn, is the first section 7 which is composed of the upper segment 18 and the lower segment 19. The lower segment 19 of the beater element 22, in turn, is followed by the second section 8 of the beater element 22, the deepest point of which forms the middle 33.

Through radius R, the second section 8 is followed by the third section 9 which is composed of the lower segment 21 and the upper segment 20. End 13 extends at the third section 9, deflected to the horizontal line, and, in turn, is followed by an end section which is deflected by 90° (not shown in the drawing) and abuts against the peripheral surface 31 of the drive shaft 2.

As can be seen in the Figures, the beater element 22 forms the outward wire loop so that the middle 27 forms also the point of contact in the bottom of a bowl (not shown). To fixedly arrange the beater elements 3, 22 with respect to each other, the two sections 5, 8 can be rigidly connected with each other in their middles 27, 33, for example, welded or cemented.

As can further be seen in FIGS. 1 to 3, the end sections 29, 30, 32 of the beater elements 3, 22 are rigidly connected to the drive shaft 2 by way of a plastic hub 34 spray-coated around these parts. To this end, the plastic hub 34 may be of bipartite design, its subdivision being at the level of the ends 10, 11, 12 and 13. Thus, the hub will consist of two parts connected to each other by ultrazonic welding or ultrazonic cementing, for example.

As can be seen in the Figures still further, collars 35 are provided on the hub 34 where the ends 10, 11, 12 and 13 terminate. The collars embrace the ends 10, 11, 12, 13 annularly and, in addition, serve to reinforce the beater elements 3, 22 or to give them better hold.

At the end of the drive shaft 2 remote from the beater elements 3, 22, a plastic sleeve 36 is injection molded on the drive shaft and has on its peripheral surface meshes 37, spread over the circumference, which, on attachment of beater 1 into coupling sleeves (not shown) provided on a hand mixer, are coupled with the mixer in an anti-rotation manner so that the beaters 1 will start to rotate when the hand mixer is switched on. Constrictions 38 are still provided on the ends of the plastic sleeves 36 and ensure axial securement of the beaters to the hand mixer when the beaters are slipped into the driving sleeves (not shown). Spring elements provided on the coupling elements of the hand mixer will lockingly snap into the constrictions 38.

An annular bead 39 projects from the lower end of the plastic sleeve 36, serving for better manipulation of the beater 1, on the one hand, and for distinguishing between the left-hand and the right-hand beater, on the other hand. Namely the right-hand beater can be provided with a multicornered annular bead 39 and the left-hand beater with a circular annular bead 39.

To avoid further repetitions, and because the two beater elements 3, 22 extend symmetrically with respect to the central line 28 and are of identical design, only the one part of the beater element 3, provided on the right of the central line 28 in FIG. 1, will be referred to.

The first section 4 of the beater element 3, composed of the upper and lower segments 14, 15, forms its largest diameter D in the amount of 52 mms approximately at the junction of the two segments 14, 15. This means that, starting from the end 10, the upper segment 14 extends transversely downwardly and, simultaneously, outwardly, while the lower segment 15, in turn, extends transversely downwardly towards the central line 28. As can be seen in FIG. 2, the part of the second section 5 extending on the right of the central line 28 runs at an angle "b" amounting to 12° approximately. However, it is also possible that the second section 5 is formed of a large radius, then followed by the radii R to the first or second sections 4 or 6, respectively.

As can be seen in FIG. 2 in addition, the dimension "d" is roughly in the amount of 35 mms, which results when the distance between the points of intersection of the upper segments 14, 15 with the associated ends 10, 11 is measured. As can still be seen in FIG. 1, two diametrically opposed flattened portions 40, 41 are provided on the drive shaft 2 and establish an improved unrotatable connection with the plastic sleeve 34 when injection molded.

As can be gathered from FIG. 3, the direction of rotation U is clockwise, while it is counterclockwise due to the reversed illustration according to FIGS. 1 and 2. The beater 1 shown herein rotates in the direction to the left, because the lower segments 15, 17, 19, 21 must be in the lead of the upper segments 14, 16, 18, 20 according to the present invention.

Further, the annular bead 39 serves to mark the correct fitting of the beater into the proper coupling mechanism in the hand mixer (not shown). For example, the beater provided with a round annular bead 39 is intended as a right-hand beater for the hand mixer, while the annular bead 39 having a multicornered configuration is intended as a left-hand beater for the same hand mixer, i.e. the right-hand beater 1, as shown in FIG. 1, turns to the left and the left-hand beater turns to the right. The denomination of the right-hand or left-hand beaters depends on where it is installed into the coupling mechanism provided for this purpose when the hand mixer is being held. From the point of view of a user, on manipulation of the hand mixer, the right-hand beater is fitted ino the right-hand coupling mechanism and the left-hand beater is fitted into the left-hand coupling mechanism.

Very good mixing results are achieved by the fact that, according to the present invention, each upper segment 14, 16, 18, 20 extends substantially downwardly and slightly radially outwardly, and, subsequently, the lower segment 15, 17, 19, 21 is inclined about the angle "a" in the circumferential direction U. This is because the foods in the lower segment 15, 17, 19, 21 are lifted and swung in the direction of the arrow F upwardly and radially outwardly, while in the upper segments 14, 16, 18, 20 the foods are moved, substantially, only in a radially outward direction, i.e. horizontally, as these segments extend radially outwardly to a slight degree, but substantially in parallel to the drive shaft 2. As a result, the ascending foods are accelerated horizontally, which avoids the spattering of food. In addition, circular movement P of the foods is caused according to FIG. 2, the foods being subjected to a continuous and closed flow as a result. Foods on the bottom are moved upwards, and foods placed on top are moved downwards again by the beater 1. Due to the lower segments 15, 17, 19, 21 inclined in the circumferential direction U, a relatively vertical force acts on the foods and permits abrupt distribution of the foods and good air inclusion.

According to FIG. 1, the height L of a beater element 3, 22 amounts to 75 mms approximately, while the height 1 of the lower segments 15, 17, 19, 21 amounts to 37 mms approximately.

What is claimed is:

1. A rotary beater adapted to be rotated in a predetermined direction of rotation (U) by a drive motor comprising a drive shaft portion that is adapted to be coupled to said drive motor and that has a drive axis about which said beater is rotated by said drive motor, at least one wire-shaped beater element, which starts from said drive shaft portion, extends further from said drive shaft portion in the direction of said drive axis and, finally, after a plurality of changes in its direction of extension, is led back to said drive shaft portion, the course of said beater element being substantially subdivided into a first section extending generally parallel to said drive axis, a second section extending generally transversely to said drive axis, and a third section extending generally parallel to said drive axis, said first and third sections each including upper and lower segments having different directions of extension relative to said drive axis, said first and third sections each having an upper end and a lower end, each said upper end being adjacent said drive shaft portion and having an angular offset in said predetermined direction of rotation (U) of the beater from its corresponding said lower end that is remote from said drive shaft portion, and the direction of extension of said lower segment alone essentially producing said angular offset of said upper end relative to said lower end of each of said first and third sections.

2. The beater of claim 1 wherein said lower segment of each of said first and third sections forms an angle (a) of about 120° with respect to its said upper segment.

3. The beater of claim 1 wherein the ratio of the total height (L) (parallel to said drive axis) of said beater element to the combined height (1) of said lower segment and said second section is about 2:1.

4. The beater of claim 1 wherein said upper and lower segments of each of said first and third sections are essentially straight.

5. The beater of claim 1 wherein said second section is curved.

6. The beater of claim 5 wherein said second section includes a portion inclined in relation to a line perpendicular to said drive axis at an angle (b) in the range of 5° to 20°.

7. The beater of claim 1 wherein said second section extends in an essentially straight transverse direction, and an angle (c) is formed between said transverse direction of said second section and the upper end of said first section that extends radially from said drive shaft portion, said angle (c) being about 50°.

8. The beater of claim 1 wherein said beater includes two said beater elements.

9. The beater of claim 1 wherein said beater includes two said beater elements, said second sections lie on top of each other, and each said beater element is formed of a single bent wire.

10. The beater of claim 9 wherein said lower segment of each of said first and third sections forms an angle (a) of about 120° with respect to its said upper segment.

11. The beater of claim 10 wherein said upper and lower segments of each of said first and third sections are essentially straight.

12. The beater of claim 11 wherein the ratio of the total height (L) (parallel to said drive axis) of said beater element to the combined height (1) of said lower segment and said second section is about 2:1.

13. The beater of claim 12 wherein said second section is curved.

14. The beater of claim 13 wherein said second section includes a portion inclined in relation to a line perpendicular to said drive axis at an angle (b) in the range of 5° to 20°.

15. The beater of claim 14 wherein said second section extends in an essentially straight transverse direction, and an angle (c) is formed between said transverse direction of said second section and the upper end of said first section that extends radially from said drive shaft portion, said angle (c) being about 50°.

\* \* \* \* \*